United States Patent [19]

Deaton et al.

[11] Patent Number: 4,648,199

[45] Date of Patent: Mar. 10, 1987

[54] CRUSTACEAN TRAP

[75] Inventors: Thomas P. Deaton, Mason, Ohio; Timothy R. Daniels, Marathon, Fla.

[73] Assignee: Buckhorn Material Handling Group Inc., Milford, Ohio

[21] Appl. No.: 642,108

[22] Filed: Aug. 20, 1984

[51] Int. Cl.4 ............................................. A01K 69/00
[52] U.S. Cl. ........................................ 43/100; 43/105
[58] Field of Search ................. 43/100, 101, 102, 103, 43/104, 105; 52/579, 586

[56] References Cited

U.S. PATENT DOCUMENTS

| | | | |
|---|---|---|---|
| 1,330,338 | 2/1920 | Peavy | 43/61 |
| 2,726,478 | 12/1955 | Pullen | 43/100 |
| 3,821,861 | 1/1973 | Jalbert | 43/100 |
| 3,906,655 | 9/1975 | Lowenthal | 43/100 |

Primary Examiner—Nicholas P. Godici
Assistant Examiner—Kurt Rowan
Attorney, Agent, or Firm—Beall Law Offices

[57] ABSTRACT

Disclosed is a crustacean trap (20) formed by a plurality of monolithic molded panels (24-30) serially interconnected via coupled pairs of interlocking channels integral to side margins of the panels to form a substantially non-deformable frame defining an unimpeded access portal while retaining elements (124, 132) along base margins of the panels provide a frame for a cast-in-place base (134). A lid (22) providing limited access into the interior and more limited egress from the interior of the trap is pivotally positionable within the portal between the serially interconnected panels to control access through the portal. Counter-rotating latches, lost motion and elongated brackets for the pivotal elements of the lid enhance the trap's reliability by requiring particular manual motions to pivot the lid between its closed and open positions.

18 Claims, 12 Drawing Figures

CRUSTACEAN TRAP

TECHNICAL FIELD

This invention pertains to animal traps generally, and more particularly, to containers having exit-restricting orifices for trapping crustaceans during undersea deployment.

BACKGROUND ART

Typically, currently available crustacean traps are constructed with a plurality of discrete members mounted by various types of fasteners onto a frame, with a frusto-conical opening providing crustaceans with entry into and restricted egress from the trap's interior.

Currently available traps continue to be susceptible to failure due to deterioration of either their frames, elements such as lathes or wire mesh mounted upon the frames, or the fasteners coupling the frames and the members mounted thereon. Causes of such failure are rot, corrosive action of sea water, and structural stress of the traps during deployment, retrieval and storage. Deterioration of even a single member can destroy a trap's utility, a factor which necessitates frequent maintenance. Replacement of a deteriorated member however, often involves disassembly and reconstruction of two or more sides of a trap, a time consuming task.

Recently developed traps have sought to avoid the problems of structural deterioration while minimizing the possibility of damage to their crustacean openings by providing collapsible traps constructed with a plurality of panels joined by hinges, pintels, lugs and recesses. Such structures however, have used numerous interconnectable end panels simply to form the crustacean opening leading into the trap's interior. Consequently, damage to only one of the hinge and pintel or lug and recess pairs in any of the side or numerous end panels can destroy the integrity of the entire trap.

A more recent development provides knock-down type cages formed from a plurality of plastic panels joined by interengaging lugs formed along the exterior edges of the panels. Although this facilitates disassemlby of the trap and replacement of damaged panels, such construction has previously involved the use of numerous additional members to provide egress restricting crustacean openings, walkways, and bait receptacles. Moreover, the inherently brittle nature of the plastic material used in such construction and the exposed, exterior location of the interengaging lugs makes them especially susceptible to damage during deployment, retrieval and storage, thereby rendering the entire trap susceptible to failure because of damage of one or more of the exposed, interengaging lugs.

An important feature of a trap is its orifice, usually an opening having a frusto-concial shape providing unimpeded entry of crustaceans into the trap's interior. Typically, in currently available traps, the frusto-conical opening is constructed in a side of the trap different from that used to remove the crustaceans from the trap. Consequently, and regardless of whether the frusto-conical opening is constructed as a rigid structure or as a flexible, net-like mesh, damage to the opening's structure often necessitates either reconstruction of the opening itself or partial disassembly of the trap to permit replacement of the opening's structure. Also, those traps which are amenable to nested stacking during storage expose the structure of their crustacean opening to damage through contact with other traps during careless handling.

SUMMARY OF THE INVENTION

Accordingly, it is an object of this invention to provide an improved crustacean trap.

It is another object to provide a crustacean trap that is relatively immune to structure failure.

It is yet another object to provide an easily repairable crustacean trap.

It is still another object to provide a crustacean trap construction facilitating access to its contents.

It is a further object to provide a crustacean trap having fewer parts.

It is a still further object to provide a crustacean trap having integral interconnecting members.

It is a yet further object to provide a crustacean trap having integral interconnecting members shielded from damage.

It is a still yet further object to provide a crustacean trap accommodating a cast-in-place base.

It is also an object to provide a crustacean trap having improved access panel latching.

It is another object to provide a crustacean trap having improved access to its bait receptacle.

Briefly, these and other objects are achieved with a trap constructed with a plurality of monolithic panels having retaining elements protruding transversely from the planes of the panels for engaging a base, and side margins disposed along edges of the panels with interengaging channels terminating in distal projections for serially interconnecting the panels at sides of a container. When serially interconnected, the retaining elements form a frame for accommodating a base for the trap while peripheral margins extending between the side margins provide a portal giving unrestricted access to the interior of the trap. A lid having an aperture providing limited access into and more limited egress from the trap's interior is pivotally positionable within the portal between the interconnected panels.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1:
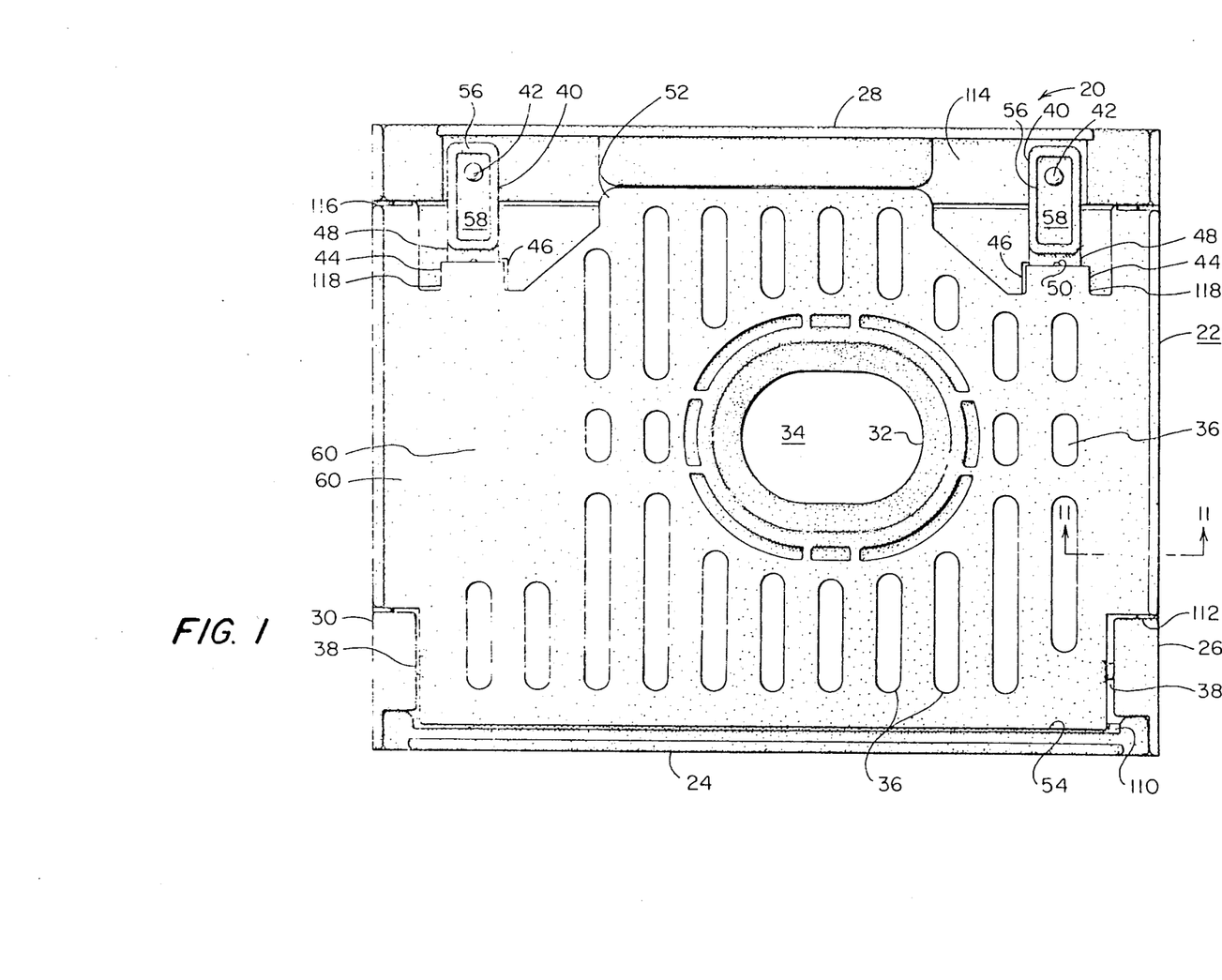
FIG. 1 is a top view of one assembled embodiment of the present invention.

Turn now to the drawings, and in particular to FIG. 1, where an assembled crustacean trap 20 is shown with a lid access panel 22 in its closed position. The trap is formed with side panel 24, end panel 26, side panel 28, and end panel 30 serially interconnected to form a rectangular frame; the peripheries of panels 24 through 30 shown in FIG. 1 define the portal covered by lid 22 providing access to the contents of the trap. The principal feature of lid 22 is a rigid, frusto-conical structure 32, of a cone or funnel shape, providing an opening 34 of decreasing cross-section via which crustaceans may enter the trap. The position of opening 34 at a location spaced substantially apart from the side and end panels and the projection (shown in FIG. 2) of cone 32 into the interior of the trap discourages a crustacean such as a crab from crawling along the interior surfaces of the side and end panels to gain egress from the trap via opening 34. Numerous small interstices 36 in the lid permit the passage of light an sea water through the trap.

Lid 22 is rotatably mounted within the portal by a pair of axially aligned pintels 38 received by brackets (not visible) in end panels 26, 30. As shown in FIG. 1, sufficient end-play exists between end panels 26, 30 and the corresponding surfaces of lid 22 to permit pintels 38 to be disengaged by manipulation of lid 22 when the lid is in an open position, thereby allowing the lid to be completely removed from the trap. A pair of latches 40 are rotatably mounted with fasteners 42 to both ends of the peripheral surface of side panel 28. Lips 44 extend outward from the plane of lid 22 and project into precesses formed along one side thereof, partially covering openings 46 formed within the recessed portion of the lid. These recesses allow latches 40 to be rotated from axially aligned positions along the periphery of side panel 28 and into engagement with the undersurface of lips 44, thereby detaining lid 22 in its closed position within the portal defined by serially connected panels 24-30. When in this position, raised bosses 50 on distal portions 48 of latches 40 are received by conforming indents (not shown) formed within the under surfaces of lips 44, thereby securely holding distal ends 48 in latched positions. When in its closed position, a tongue 52 of lid 22 rests upon the peripheral surface of side panel 28 and butt edge 54 rests upon the peripheral surface of side panel 24 while under surfaces of the lid rest upon the peripheral edges of end panels 26 and 30, thereby preventing lid 22 from falling into the interior of the trap.

Raised margins 56 around all but the distal portions of latches 40 defined inset portions 58 that conveniently permit manual rotation of latches 40 between their latched and unlatched positions. It may be noted that the symmetric pivotal mounting of latches 40 in conjunction with the oblique formation of the recesses within the plane of lid 22 assures that latches 40 can only be moved from a latched position into an unlatched position by application of couples with oppositely directed rotational senses. Consequently, when the latches are subjected to forces created by the flow of seawater during retrieval of the trap, at worst, those forces will have the correct direction for rotating only one of the latches from its latched position. The necessity for counterrotation of the latches therefore assures that lid 22 will remain at least partially latched and in its closed position during retrieval.

An imperforate area 60 of lid 22 serves to completely cover the open side of a bait receptacle (not visible) hung from end of panel 30 with an open surface adjoining the undersid eof lid 22. Imperforate area 60 of lid 22 ocvers the open surface of the bait receptacle and prevents crustaceans from having access to the bait from the exterior of the trap while lid 22 is in its closed position.

Figure 2:
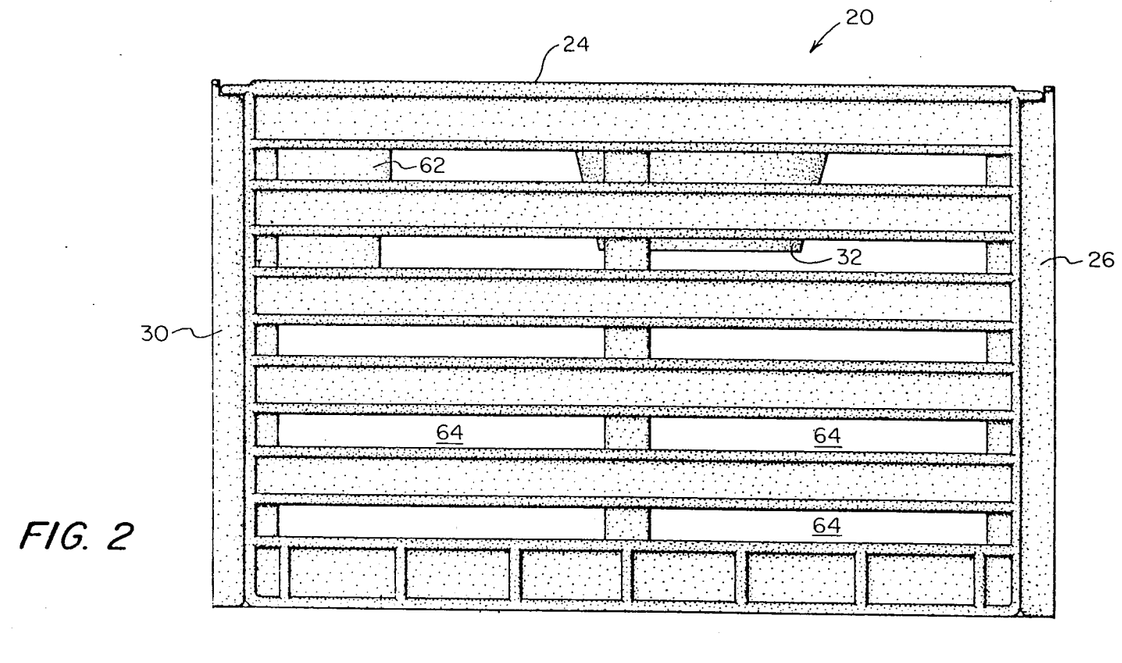
FIG. 2 is a side view of an assembled embodiment.

The side view provided by FIG. 2 shows the serial interconnection of side panel 24 between end panels 26 and 30. The projection of the rigid structure 32 of the crustacean aperture 34 into a central portion of the interior of the trap at a locatoin spaced well apart from either of the end panels 26, 30 is also shown. Receptacle 62 for holding bait is shown mounted against end panel 30. Panel 24 contains numerous interstices 64 permitting the passage of light and sea water through the trap.

Figure 3:
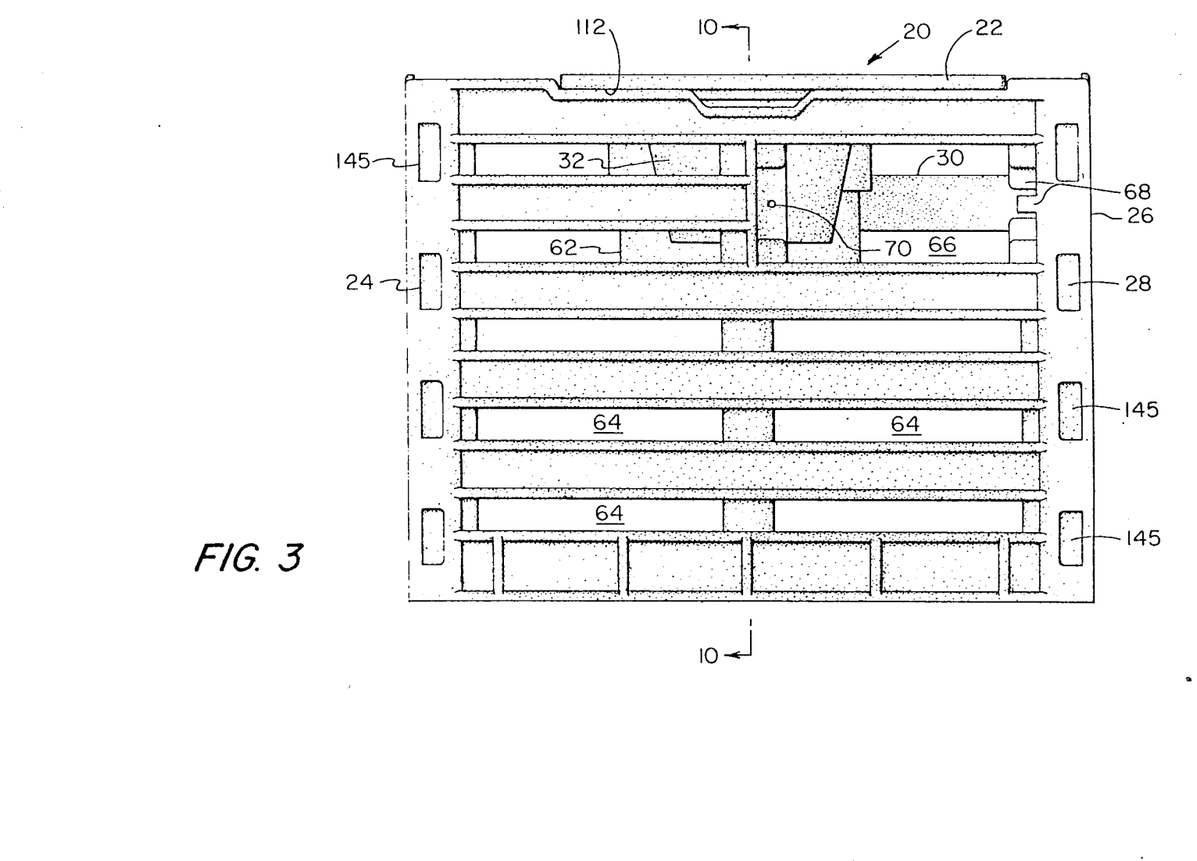
FIG. 3 is an end view of an assembled embodiment.

FIG. 3 provides an elevational view of end panel 26 showing the serial interconnection between end panel 26 and side panels 24, 28, the interior displacement of cone structure 32 and bait receptacle 62 relative to the underside of lid 22. Panel 26 contains several interstices 64. The omission of one portion of panel 26 establishes a larger opening 66 through which crustaceans may readily escape from the interior of the trap. This opening is normally blocked by a water degradable material (not shown), for example wood, mounted between lugs 68 at one end of port 66 and attached at its other end to the panel via hole 70, for example with a screw. When the trap remains submerged and unretrieved for a long period, the consequental deterioration of the water soluble material ultimately permits the escape of crustaceans from the trap via port 66.

Figure 4:
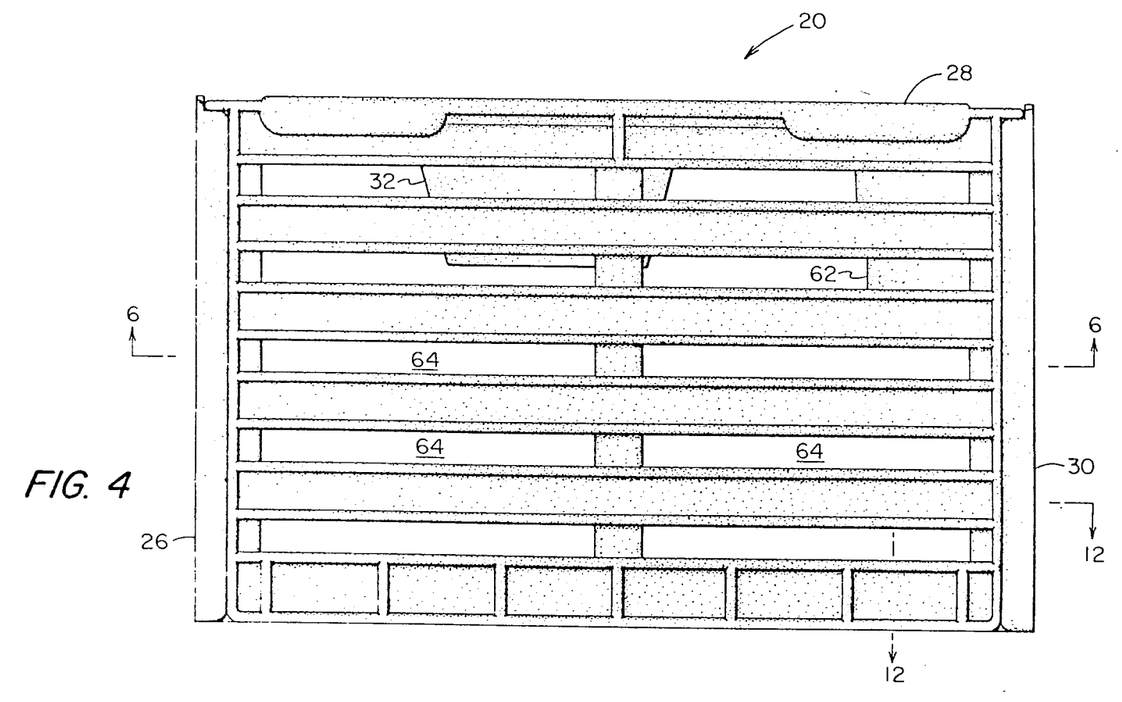
FIG. 4 is a second side view of an assembled embodiment.

FIG. 4 provides a side view showing the serial interconnection between end panels 26, 30 and side panel 28, and the relative displacement of cone structure 32 and bait receptacle 62. Side panel 28 is perforated by numerous interstices 64.

Figure 5:
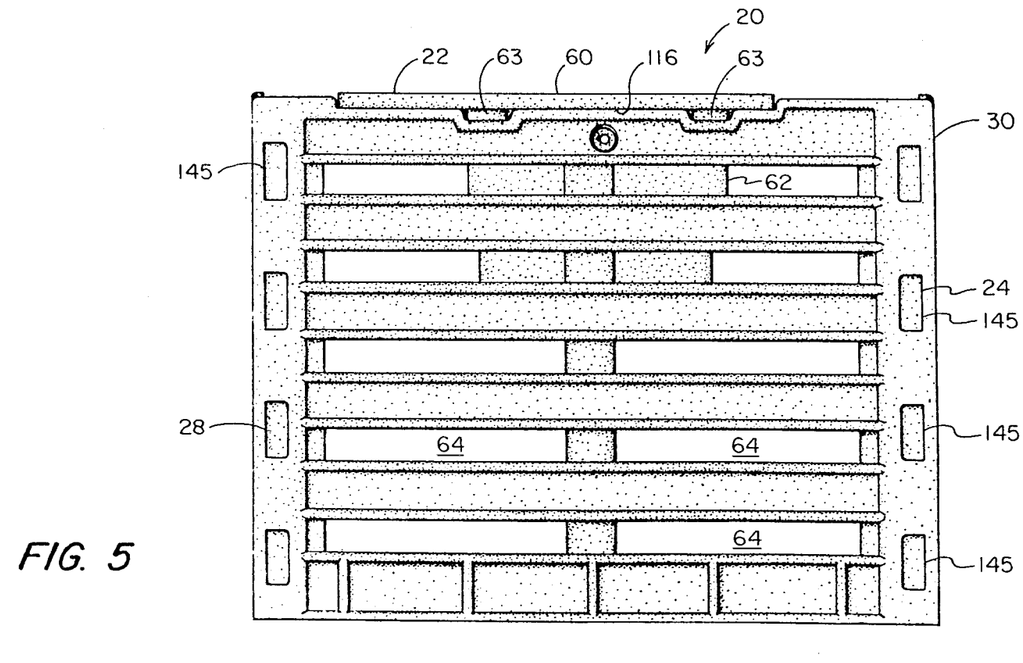
FIG. 5 is a second end view of an assembled embodiment.

FIG. 5 provides an end view showing the serial interconnection between side panels 24, 28 and end panel 30, and the proximity of bait receptacle 62 to the underside of unperforated area 60 of lid 22. End panel 30 is also perforated by numerous interstices 64. The periphery of receptacle 62 surrounding its open top (not visible) adjoining the underside of the non-perforated area 60 of lid 22 includes two outwardly projecting lugs 63. These lugs slip over and surround conforming studs projecting upwardly from the periphery of end panel 30, thereby allowing recepacle 62 to be hung from the inside interior of end panel 30. When so hung, lid 22 prevents lugs 63 from becoming disengaged, thus both preventing receptacle 62 from being removed and completely covering the open top of the receptacle while the lid is in its closed position as shown.

Figure 6:
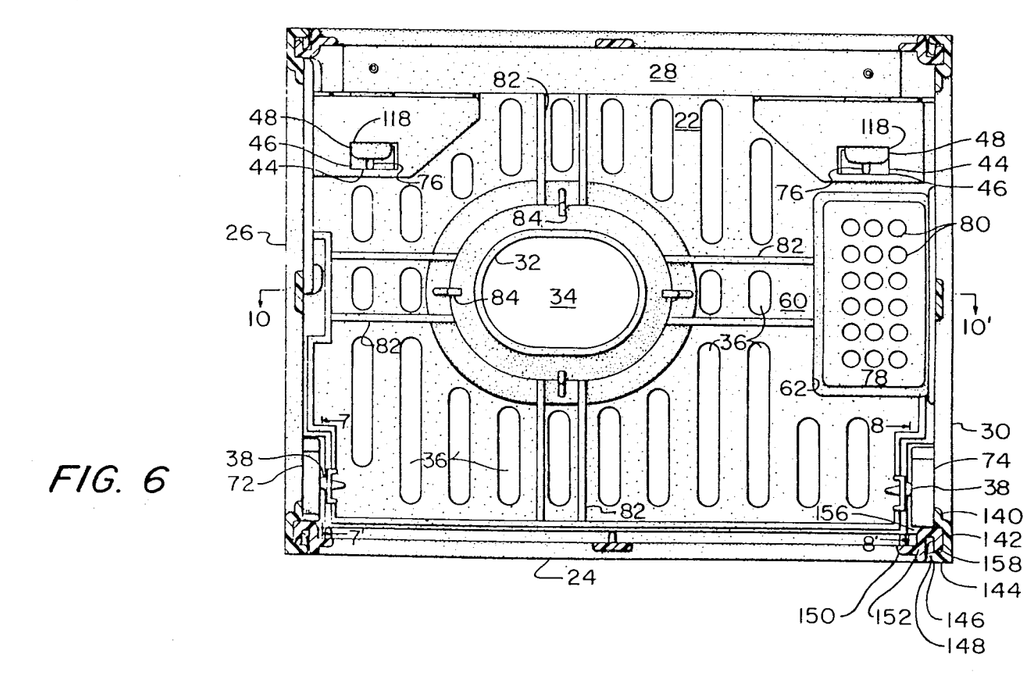
FIG. 6 is a cross-sectional view taken along line 6–6' in FIG. 4.

FIG. 6 provides an inside view of the trap directed toward lid 22 and outwardly through aperture 34. The pintels 38 of the lid are shown within pintel brackets 72, 74 of side panels 26, 30 respectively. Brackets 72, 74 are shown in greater detail in FIGS. 7 and 8 respectively, and provide tracks for movement of pintels 38 transversely to their axis of rotation.

The distal portions 48 of the latches are shown in their latched positions whereby the raised bosses are held within indents 76 on the undersides of lips 44.

It may be noted that bait receptacle 62 has a bottom surface 78 perforated by numerous openings 80 to allow the aroma of the bait to trickle into the interior of the trap.

A plurality of ridges 82 longitudinally strengthen the underside of lid 22 while numerous buttresses 84 enhance the rigidity of cone structure 32.

Figure 7:
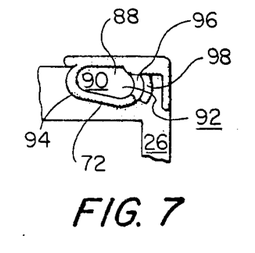
FIGS. 7 and 8 are cross-sectional views taken along lines 7–7' and 8–8' of FIG. 6.
Figure 8:
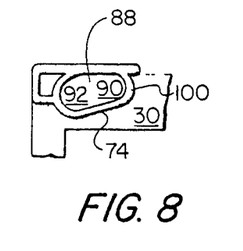

FIGS. 7 and 8 respectively show elongated pintel brackets 72, 74 of sides 26, 30. Each bracket includes a recessed area 88 formed from a forward region 90 of lesser cross-sectional area and an adjoining region 92 of greater cross-sectional area. A raised partial rim 94 surrounds forward region 90 and, in conjunction with bar 96 having a lesser height than rim 94, encircles adjoining region 92. A step 98 provides a gradual transition between the interior surface of side panel 26 and the reduced height of bar 96. A raised rim 100 completely encircles forward region 90 and adjoining region 92 of bracket 74. As shown in FIG. 1, sufficient end-play exists between end panels 26, 30 and the corresponding surfaces of lid 22 to permit pintels 38 to be disengaged by manipulation of lid 22 when the lid is in an open position, thereby allowing the lid to be completely removed from the trap. Accordingly, when panels 24–30 are serially interconnected with panels 26, 30 oppositely disposed at different ends of the assembled container and with forward regions 90 of brackets 72, 74 in opposed axial alignment, one pintel 38 may be placed in forward region 90 of bracket 74 while the other pintel 38 is moved across the interior surface of panel 26, up step 98, across bar 96, into adjoining region 92, and then into forward region 90 of bracket 72 in an axial alignment with the other pintel already positioned in forward region 90 of bracket 74. This procedure allows lid 22 to be inserted within the portal formed by the peripheral surfaces of panels 24–30 after those panels are serially interconnected. By reversing the procedure and rotatably translating the entire panel about forward region 90 of bracket 72, one pintel may be removed from bracket 72, thereby allowing the entire lid to be removed from the assembled container in a single manual motion while the lid is held in an open position relative to the portal. Step 98, which is ramp shaped, makes assembly, in the manner of a snap fit, easier than disassembly because the surface of step 98 facing outwardly from region 92 provides a short, albeit gradual ramp for the pintel while the surface bordering the interior of region 92 forms an abrupt, albeit low, step.

When both pintels 38 are held by bracket 72, 74, the lid is free to rotate about axes of alignment extending between regions 90; however, when pintels 38 are in axial alignment with regions 92, butt edge 54 of lid 22 restricts rotation of lid 22 through part of an arc. Consequently, pintels 38 should be in axial alignment with regions 90 to provide the widest arc of rotational movement of lid 22.

As shown in FIG. 1, the peripheral edges of panels 24–30 provide ledges 110, 112, 114, 116 respectively, bordering the access portal defined by serially interconnected panels 24–30. When in its closed position and limiting access to the interior of the container to that provided by opening 34, as shown in FIGS. 1, 3 and 5, the undersurfaces along all four sides of lid 22 rest upon the respective ledges 110–116, thereby preventing lid 22 from being forced into the interior of the container. When latches 40 are moved in counter-rotation from the position shown in FIG. 1, in the manner shown in FIG. 9, the proximity of butt edge 54 to ledge 110 prevents lid 22 from being raised from its closed position.

Figure 9:
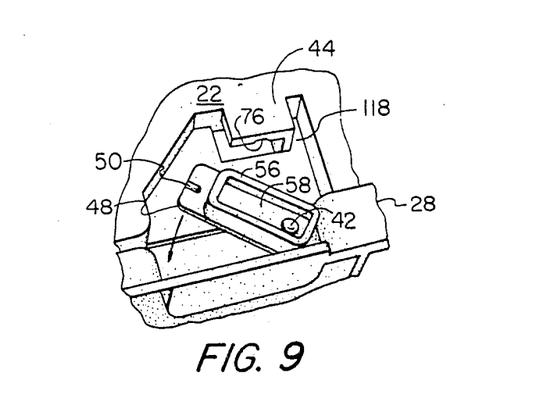
FIG. 9 is a perspective view of a latching mechanism used in one embodiment.

Consequently, to raise lid 22 from its closed position with pintels 38 in axial alignment between adjoining regions 92, lid 22 must be moved transversely to shift the axis of alignment between pintels 38 from between regions 92 to forward regions 90, thereby allowing the lid to be raised by rotation about pintels 38 in regions 90 while providing sufficient clearance between butt edge 44 and panel 24. This requirement for transverse shifting of the axis of alignment before lid 22 is free to move from its closed position assures that when latches 40 are in an open position, crustaceans within the interior of the container cannot effect an escape by forcing the lid from its closed position. The features of hinge brackets 72, 74 which allow insertion, axial translation and rotation of lid 22 and the location of brackets 72, 74 in close proximity to panel 24 assures that when lid 22 is raised to its open position, complete access is provided to the interior of the container as well as to the interior surfaces of panels 24–30 and any base held between those panels. This feature is significant because often several crustaceans will lock claws and form a large mass within the interior of a trap, thereby preventing their removal through a small access portal. The unrestricted access provided by lid 22 avoids the inconvenience caused by such an occurrence.

It may be noted that transverse walls 118 between lip 44 and the recessed surface of lid 22 prevent latches 40 from rotating in more than one direction from their closed positions.

Figure 10:
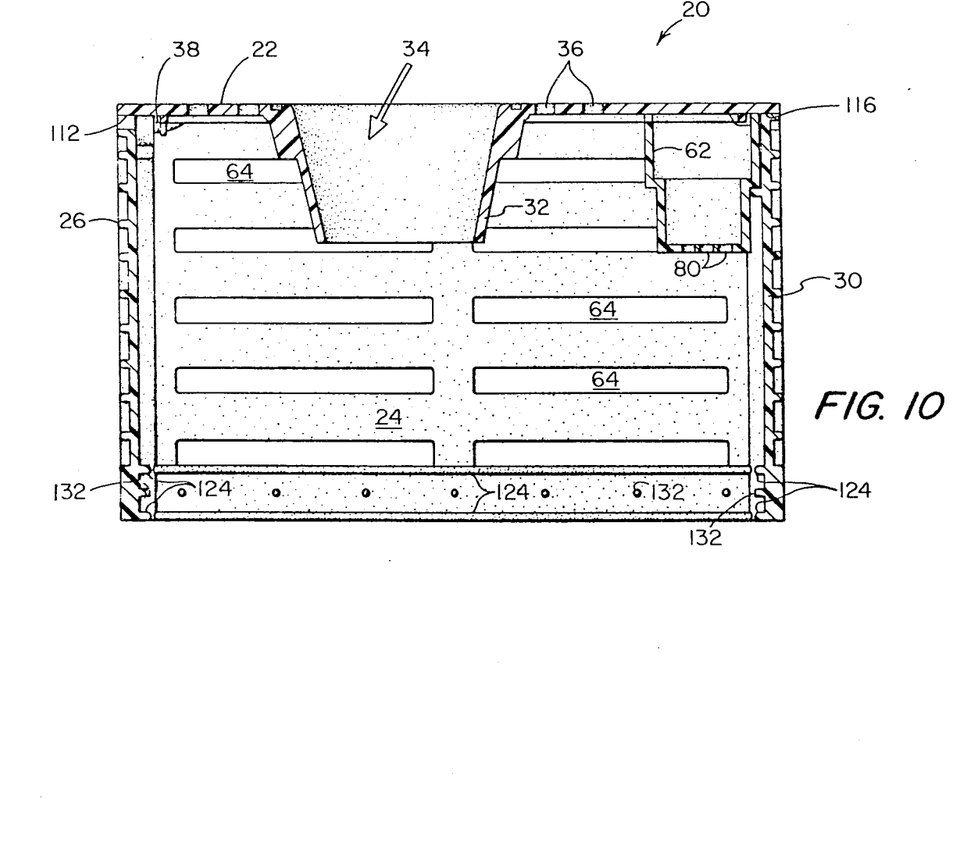
FIG. 10 is a cross-sectional side view taken along lines 10–10' in FIGS. 3 and 6.
Figure 11:
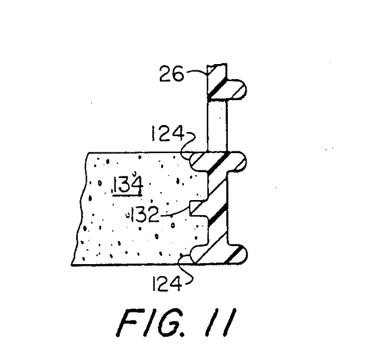
FIG. 11 is a partial cross-sectional view taken along line 11–11' in FIG. 1.

FIG. 10 provides an inside view showing the relative displacement between serially interconnected panels 24, 26 and 30, cone structure 32, bait receptacle 62 and lid 22. A pair of substantially parallel, ribbed margins 124 run along the lower extremities of panels 24–30, thereby providing a frame along the lower extremities of those panels when they are serially interconnected to form container 20. Numerous protruding elements 132 extend transversely from the planes of each panel into the interior of container 20. When serially interconnected, the container 20 may be set on a supporting substrate adjoining the lower of margins 124, and a base may be formed between the pairs of margins 124 by pouring a time-curing substance such as ordinary concrete into the bottom portion of container 20. As shown in FIG. 11, the concrete, when cured, forms a base 134 extending in thickness between lower margins 124 and surrounding protruding elements 132. Consequently, the contacting relation between base 134, protruding elements 132 and upper and lower margins 124 along the lower portion of each panel securely holds base 134 in place as the bottom portion of container 20 while simultaneously locking panels 24–30 in position thereby preventing relative movement between the panels. The material of base 134 provides an inexpensive, sturdy weight substantially impervious to deterioration from sea water and rough handling, and having an average density greater than that of the side and lid panels, thereby tending to assure that the trap will sink and remain in an upright position when deployed.

Figure 12:
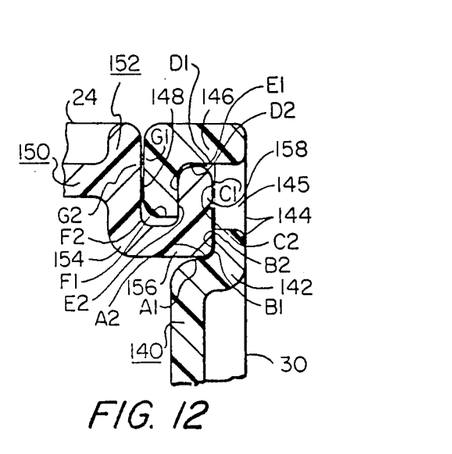
FIG. 12 is a partial cross-sectional view taken along line 12-12' in FIG. 4.

FIGS. 6 and 12 show details of the serial interconnection between panels 24, 30. Note that FIG. 6 is a cross-sectional view directed toward lid 22 while FIG. 12 is oppositely directed toward the base of the assembled container; therefore, the members shown in FIGS. 6 and 12 appear in mirror image configurations. Note also that FIGS. 6 and 12 are taken at different locations; consequently, these views differ in some details.

Each of the panels 24-30 has side margins terminating the two of its oppositely disposed edges extending between the respectively peripheral surfaces defining the access portal and margins 124 framing the base side of container 20. These side margins have one of two channel-like configurations. Wall 140 of end panel 30 terminates in a portion 142 offset outwardly from the interior of container 20. A web 144 extensed between offset portion 142 and a flange 146 extending laterally inward toward side panel 24. The opposite end of flange 146 most proximate to side panel 24 joins a distal projection 148 extending inwardly toward the interior of container 20 and the interior surface of wall 140. The side margin of panel 24 includes wall 150 terminated by flange 152 extending transversely across the width of wall 150. Flange 152 is jointed by an outwardly directed offset portion 154 to a web 156 extending outwardly from the interior of container 20. Web 156 is joined to flange 158 terminating in a distal projection extending outwardly from the interior of the container and away from wall 140 of end panel 30. It is noted that in FIG. 12, mold relief 145 (shown in FIG. 5) appears to interrupt the continuity of web 144. Mold reliefs 145 are included in the structures of the side margins of end panels 26, 30 to facilitate manufacture of those panels. Specifically, mold reliefs 145 facilitate the opening of the molds to accommodate the distal projections 148 extending inwardly from flanges 146. Accordingly, in those sections of end panels 26, 30, as shown in FIG. 6, where web 144 is shown as a continuous structure uninterrupted by a mold relief 145, the opposite portion of distal projection 148 is shown as a discontinuous structure. It is noted that a more complicated mold can be used to provide web structures 144 and distal projections 148 that extend continuously, without interruption along the side margins of end panels 26, 30.

The complementary nature of the two channel configurations forming the margins of side panels 24-30 allows those panels to be manually joined simply by sliding complementary channels along side margins of the panels into engagement, thereby serially interconnecting the panels to form the four sides of container 20. Inside surface A1 of offset portion 142 then contacts outside surface A2 of web 156. An abutment B1 at the junction between offset portion 142 and web 144 contacts a conforming abutment surface B2 at the junction between web 156 and flange 158 while inside surface C1 of web 144 engages the outside surface C2 of flange 158. Inside surface D1 of flange 146 is disposed adjacent the distal periphery D2 of flange 158 while inside surface E1 of distal projection 148 contacts inside surface E2 of flange 158. Distal periphery F1 of projection 148 is disposed adjacent inside surface F2 of web 156 while outside surface G1 of projection 148 contacts surface G2 of flange 152. In effect, the five inside surfaces A1-E1 of end panel 30 form a partially closed, four sided channel engaging the four outside surfaces A2-D2 and inside surface E2 of side panel 24 while the three outside surfaces E2-G2 of side panel 24 form a second channel engaging inside surface E1 and ouside surfaces F1, G1 of end panel 30. Consequently, those portions of the interlocking channels, namely the distal projections 148 and 158 most vulnerable to damage during deployment, retrieval and storage of trap 20 and internally shielded by such other components of the interlocking channels as web 144, and flanges 146, 152. Moreover, the arrangement of the abutment surfaces in alignment along a plane passing through the corner formed by the interlocking channels, tangentially to the interior of container 20, provides substantially rigid corner structures better able to reist deformation of trap 20 during retrieval and subsequent handling, a feature which contributes to both the reliablilty of the trap and its resistance to structural failure.

Each of the two side panels, two end panels, lid panel, and bait box is preferably made of one homogenous piece by injection molding a plastic or synthetic resin material, in solid or structural foam form.

It is apparent from the foregoing discussion that the present invention provides an easily assemblable and maintainable crustacean trap. The sliding engagement of the monolithic panels and the complete removeability of the lid provides a structure in which any damaged member can be quickly replaced with a like, readily available panel. Moreover, the simultaneous and unimpeded direct access provided by the pivotally removeable lid to both the interior surfaces of all panels and the base and to the contents of the bait box facilitates retrieval of the trap and removal of the harvested crabs, particularly where the trap has successfully ensnared a number of crustaceans which have locked claws and formed a large mass inside the trap. Both the counter-rotational forces required for unlatching of the lid and the transverse axial displacement of the lid's axis of rotation contribute to further enchancement of the reliability of this trap, factors which are significant in retaining the harvested crustaceans as the trap is retrieved.

We claim:

1. A crustacean trap, comprising:
    a plurality of substantially planar, monolithic, molded plastic, side panels having first margins including retaining means protruding transversely from the planes of said panels for engaging a base, having side margins disposed along edges transverse to said first margins, and having peripheral margins extending between said side margins;
    said side margins including locking means integral to said panels, having channels opening along directions transverse to the planes of said panels and terminating in distal projections;
    said locking means of adjacent panels retentively inter-engaging by assembly movement parallel to said side margins, in coupled pairs and serially interconnecting said plurality of panels as sides of a container, with said distal projections of one channel being within the adjacent channel to be shielded within said channels from the exterior of said container;
    said peripheral margins defining a portal providing access to the interior of said container;
    a substantially planar, cover panel pivotally positioned within said portal between said plurality of serially interconnected side panels for controlling access through said portal; and
    funnel means within said cover panel having an aperture providing limited access into said interior and more limited egress from said interior for crustaceans.

2. The trap of claim 1, wherein said locking means comprises different configurations of slidably engageable side margins, a pair of said side margins being formed integrally with the walls of each of said panels along opposite terminal portions of said panels.

3. The trap of claim 1, wherein:

one of said side margins includes a first web offset outwardly from the wall of one of said panels, a first flange extending inwardly from said first web, and a first one of said distal projections having oppositely disposed inner and outer wall surfaces extending inwardly from said first flange with said inner surface spaced apart from said first web to define a first channel; and another of said side margins includes a second flange extending transversely across the wall of one of said panels, a second web extending outwardly from said second flange and offset inwardly from said wall, and a second one of said distal projections having oppositely disposed first and second surfaces extending outwardly from said second web with said first surface spaced apart from said second flange to define a second channel for slidably receiving said first projection when the walls of said panels ar perpendicularly arranged with said second disal projection disposed within said first channel and with said first surface contacting said inner surface and said second surface contacting said first web.

4. The trap of claim 3, wherein the junction between said second web and said second distal projection forms an abutment, and the offset of said first web from the wall of the adjoining panels forms an indent for receiving said abutment when said first distal projection is received within said second channel.

5. The trap of claim 1, wherein insertion of a base within said retaining means restricts relative movement between said monolithic panels.

6. The trap of claim 1, wherein:
said cover means includes means for pivoting it between a closed position in which access to said interior is controlled by said aperture and an open position providing unrestricted access to said interior; and
a pair of said monolithic panels provides means disposed in axial alignment for accommodating said pivoting means during rotation of said cover between said closed and open positions.

7. The trap of claim 6, wherein said cover overlays all of said peripheral margins of said monolithic side panels when in said closed position.

8. The trap of claim 6, further comprising latch means pivotable around parallel axes to latched positions in response to application of forces of opposite rotational sense, for securing said cover in said closed position.

9. The trap of claim 8, wherein:
said cover contains recessed means for detaining distal portions of said securing means; and
said latch means are pivotally mounted on a peripheral portion of one of said monolithic side panels for rotational movement between said latched position wherein said distal portions are engaged by said recessed means, and unlatched positions wherein said cover is free to rotate between said closed and open positions.

10. The trap of claim 7, wherein one of said monolithic side panels includes holding means for releasable supporting within said interior, a bait receptacle having an open top, in a location adjacent to said portal with said open top adjoining and directly covered by said cover means in said closed position; and said holding means is disabled against releasing said bait receptacle by said cover being in said closed position.

11. A crustacean trap, comprising:

a plurality of serially connected monolithic, molded plastic, side panels forming a container, said side panels having edges serially adjacent in a closed configuration forming peripheral margins defining a portal providing unrestricted access to the interior of said container;

an additional monolithic, molded plastic, side closure panel pivotally mounted on said first-mentioned side panels to be positionable within said portal, said side closure panel having peripheral edges respectively engaging the edges of said side panels between said plurality of serially connected panels for controlling access through said portal by pivoting between closed and open positions;

means selectively latching said closure panel in its closed position contacting said peripheral margin;

a bait receptacle having an open top and being supported by one of said first-mentioned monolithic side panels in a location adjacent to said portal with said open top adjoining and directly covered by the inside surface of said closure panel when in said closed position; and said bait receptacle being sufficiently smaller than said container so that crustaceans may be manually removed from said container through said portal by pivoting said closure panel to an open position and without moving said bait receptacle relative to said container side panels.

12. The crustacean trap of claim 11, wherein the portion of said closure panel covering said open top is free of perforations.

13. A crustacean trap, comprising:
a plurality of substantially planar, monolithic, molded plastic, side panels having first margins including retaining means protruding transversely from the planes of said panels for engaging a base, having side margins disposed along edges transverse to said first margins, and having peripheral margins extending between said side margins;

said side margins including locking means integral to said panels, having channels opening along directions transverse to the planes of said panels and terminating in distal projections;

said locking means of adjacent panels retentively inter-engaging by assembly movement parallel to said side margins, in coupled pairs and serially interconnecting said plurality of panels as sides of a container, with said distal projections of one channel within the adjacent channel to be shielded within said channels from the exterior of said container;

said peripheral margins defining a portal providing access to the interior of said container;

a substantially planar, cover panel pivotally positioned within said portal between said plurality of serially interconnected side panels for controlling access through said portal; and funnel means within said cover panel having an aperture providing limited access into said interior and more limited egress from said interior for crustaceans;

said one of said side panels including engageable studs disposed against said closure panel when in said closed position, and said bait receptacle includeing lugs having apertures releasably engaging around said engageable studs while said closure panel is in said open position and when said engageable studs engage against said closure panel when said controlling means is in said closed position said lugs are prevented from being disengaged from said studs.

14. A crustacean trap, comprising:

a plurality of substantially planar, monolithic, molded plastic side panels having first margins including retaining means protruding transversly from the planes of said panels for engaging a base, and having side margins disposed along edges transverse to said first margins, said side margins including retaining means intergral to said panels for selectively retentively interengaging in coupled pairs and serially interconnecting said plurality of side panels as sides of a container with said first margins forming framing means having said retaining means oriented toward the interior of said container for holding a base within said framing means; and bottom means formed from a substance curing over time to a solid phase, disposed within said framing means and enbedding said portion of framing means for permanently locking said panels in a serially interconnected relation.

15. A crustacean trap comprising:

a plurality of serially connected monolithic, molded plastic, substantially planar, sides and a substantially planar base forming a container having an open side;

a substantially planar, monolithic, molded plastic lid pivotally connected to said container for covering said open side;

funnel means disposed into one of said sides and lid providing passage for crustaceans into said container and limiting their egress; and a pair of latches mounted on said serially connected sides to pivot about parallel axes from first positions re taining the edges of said lid against said serially connected sides to second positions permitting said edges of said lid to be pivoted away from said serially connected sides;

means limiting the rotation of said latches respectively to only clockwise and counter clockwise rotation from said first positions to said second positions so that water pressure on said latches caused by relative movement between said trap and the water will, at most, exert a force to one of said latches toward said first position and simultaneously exert a force to the other of said latches toward said second position to prevent unintentional unlatching and opening of said lid during retrieval of the trap.

16. The crustacean trap of claim 15, wherein:

said latches each have distal portions engaging said lid while said latches are in said first positions; and said lid contains a pair of recesses having open sides to receive different ones of said distal portions and closed sides to limit rotation of said latches about said parallel axes.

17. A crustacean trap, comprising:

a plurality of monolithic, substantially planar, molded plastic, side panels serially connected together as sides of a container having a portal providing access to the interior of said container and top edges bordering said portal along each of said side panels;

a substantially planar, molded plastic, cover panel having peripheral edges respectively overlapping horizontally and being supported on top of said top edges of each of said side panels;

hinge means pivotally positioning said cover within said portal between said plurality of serially connected side panels for controlling access through said portal for pivotal movement of said cover between a closed position and an open position;

said hinge means having its axis of cover rotation mounted on said side panels for transverse, horizontal shifting from the closed position wherein said cover peripheral edges overlap all of said top edges and said cover cannot pivot to said open position to a hinge shifted position wherein the cover peripheal edge portion adjacent one of said side panels is horizontally spaced from said one side panel to permit pivoting of said cover to said open position;

funnel means providing passage to crustaceans disposed into one of said panels; and a base extending between the lower edges of said side panels to close the bottom of said container.

18. The crustacean trap of claim 17, said container having unitary symmetrically disposed brackets having elongated recesses with forward regions having first cross-sectional areas disposed at opposite ends of an axis of alignment and adjoining regions having greater cross-sectional areas, a first of said brackets having a closed rim surrounding corresponding ones of said forward and adjacent regions, and the second of said brackets having a partial rim surrounding the other of said forward regions and a bar having a lesser height than said partial rim joining said partial rim to surround the other of said adjoining regions, both of said rims forming ramps disposed along interior portions of said adjoining regions most proximate to said ledges of said pair of oppositely disposed panels; and said cover including pivot studs insertable between said brackets after serial connection of said plurality of side panels, for bearing rotational movement of said cover through an arc centered upon said axis of alignment and extending between said open position and an intermediate position while said pivoting means is axially aligned within said forward regions, for bearing lateral displacement of said controlling means from said intermediate position to said closed position with undersurfaces of said controlling means resting against said top edges of each of said side panels as said hinge means is displaced from said axis of alignment between said forward regions and into axial alignment between said adjoining regions, and for bearing rotational displacement of said cover about the forward region of said first of said brackets while said cover is in said open position and said hinge means is laterally displaced from the adjacent region and across said brackets.

* * * * *